US012627022B2

(12) United States Patent
Doumanis

(10) Patent No.: US 12,627,022 B2
(45) Date of Patent: May 12, 2026

(54) RESONATOR

(71) Applicant: Nokia Solutions and Networks Oy, Espoo (FI)

(72) Inventor: Efstratios Doumanis, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 351 days.

(21) Appl. No.: 18/033,845

(22) PCT Filed: Oct. 22, 2021

(86) PCT No.: PCT/EP2021/079398
§ 371 (c)(1),
(2) Date: Apr. 26, 2023

(87) PCT Pub. No.: WO2022/090089
PCT Pub. Date: May 5, 2022

(65) Prior Publication Data

US 2023/0395964 A1 Dec. 7, 2023

(30) Foreign Application Priority Data

Oct. 29, 2020 (FI) ..................................... 20206078

(51) Int. Cl.
*H01P 7/06* (2006.01)
*H01P 7/04* (2006.01)
*H01P 11/00* (2006.01)

(52) U.S. Cl.
CPC .................. *H01P 7/06* (2013.01); *H01P 7/04* (2013.01); *H01P 11/008* (2013.01)

(58) Field of Classification Search
CPC .... H01P 7/06; H01P 7/10; H01P 7/105; H01P 7/04; H01P 7/00; H01P 11/008; H01P 1/202; H01P 1/208
See application file for complete search history.

(56) References Cited

U.S. PATENT DOCUMENTS

2014/0327499 A1* 11/2014 Park ........................ H01P 1/208 333/203
2015/0318594 A1* 11/2015 Kang .................... H01P 1/2084 333/219.1
2021/0344092 A1* 11/2021 Yoshikawa ............... H01P 7/04

FOREIGN PATENT DOCUMENTS

WO WO 2020/054663 A1 3/2020
WO WO 2020/090547 A1 5/2020
WO WO 2020/158793 A1 8/2020

OTHER PUBLICATIONS

Machine Translation of WO2020/158793A1, Aug. 6, 2020 (Year: 2020).*

* cited by examiner

*Primary Examiner* — Stephen E. Jones
(74) *Attorney, Agent, or Firm* — McCarter & English, LLP

(57) ABSTRACT

A resonator is described including: a first part of a metal cavity; a first ring extending from the first part of the metal cavity, wherein at least part of an external surface of the first supporting ring is coated with a first metal coating that provides an electrical connection to the metal cavity; a second part of the metal cavity; and a ceramic ring extending from the second part of the metal cavity. At least part of an external surface of the ceramic ring is coated with a second metal coating that provides an electrical connection to the metal cavity, wherein the first and second parts are mounted to form the metal cavity such that the first ring and the ceramic ring partially overlap such that at least part of the ceramic ring is between at least parts of the first and second metal coatings.

20 Claims, 6 Drawing Sheets

RESONATOR

CROSS REFERENCE TO RELATED APPLICATION

This patent application is a U.S. National Stage application of International Patent Application Number PCT/EP2021/079398 filed Oct. 22, 2021, which is hereby incorporated by reference in its entirety, and claims priority to FI 20206078 filed Oct. 29, 2020.

FIELD

This present specification relates to resonators and filters, such as radio frequency resonators and filters.

BACKGROUND

A number of resonator configurations, such as ceramic resonators, are known. Although many resonator configurations are known, there remains a need for further developments in this field.

SUMMARY

In a first aspect, this specification describes a resonator comprising: a first part of a metal cavity; a first ring (e.g. a first supporting ring) extending from the first part of the metal cavity, wherein at least part of an external surface of the first ring is coated with a first metal coating (such as silver) that provides an electrical connection to the metal cavity; a second part of the metal cavity; and a ceramic ring extending from the second part of the metal cavity, wherein at least part of an external surface of the ceramic ring is coated with a second metal coating (such as silver) that provides an electrical connection to the metal cavity, wherein the first and second parts are mounted to form the metal cavity such that the first ring and the ceramic ring partially overlap such that at least part of the ceramic ring is between at least parts of the first and second metal coatings.

The first ring may extend in a direction substantially perpendicular to the first part of the metal cavity. Similarly, the ceramic ring may extend in a direction substantially perpendicular to the second part of the metal cavity.

The first ring extends to make contact with the second part of the metal cavity. In this way, additional mechanical support may be provided.

The second part may further comprises a second ring (e.g. a second supporting ring) extending from a distal end of the ceramic ring. The second ring may extend to make contact with the first part of the metal cavity. In this way, additional mechanical support may be provided.

The ceramic ring may be hollow (such as a hollow cylindrical ring). Alternatively, or in addition, the first ring may be hollow (such as a hollow cylindrical ring). The second ring (if provided) may be hollow (such as a hollow cylindrical ring).

The first part of the metal cavity may be a lid of the metal cavity.

The resonator may further comprise a metallic tuner. The metallic tuner may form part of the first part of the metal cavity. Alternatively, the metallic tuner may form part of the second part of the metal cavity. A position of the metallic tuner within the cavity may adjustable, for example by adjusting a screw thread.

In a second aspect, this specification describes a method (e.g. a method of manufacturing a resonator) comprising:

attaching a cavity lid to a cavity base to form a metal cavity such that a first ring (e.g. a first supporting ring) and a ceramic ring of the metal cavity partially overlap such that at least part of a ceramic ring is between at least parts of a first and a second metal coating, wherein: the first ring extends from one of the lid and the base and the ceramic ring extends from the other of the lid and the base; the first ring comprises an external surface that is at least partially coated with the first metal coating, wherein, in use, the first metal coating provides an electrical connection to the metal cavity; and the ceramic ring comprises an external surface that is at least partially coated with the second metal coating, wherein, in use, the second metal coating provides an electrical connection to the metal cavity.

Attaching the cavity lid to the cavity base may comprise sliding the first ring within the ceramic ring.

The method may further comprise forming the cavity lid and/or the cavity base.

When the cavity lid is attached to the cavity base, the first ring may extend to make contact with the cavity base (or the cavity lid). Similarly, a second ring may be provided that extends from the ceramic ring to make contact with the cavity lid (or the cavity base) when the cavity lid is attached to the cavity base.

The method may further comprise adjusting a position of a metallic tuner within the metal cavity.

BRIEF DESCRIPTION OF THE DRAWINGS

Example embodiments will now be described, by way of example only, with reference to the following schematic drawings, in which.

DETAILED DESCRIPTION

Figure 1:
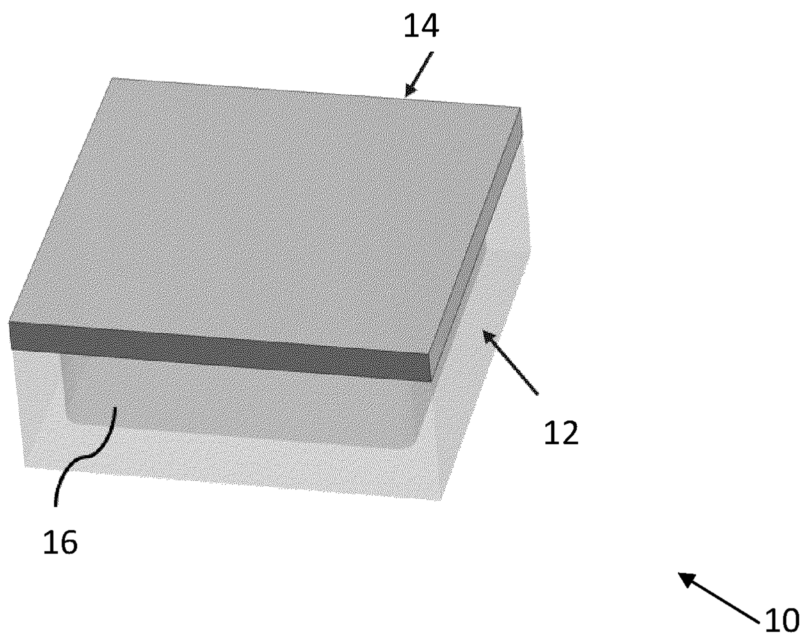
FIG. 1 shows a resonator in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

This present specification relates to resonators and to filters comprising resonators. The resonators and filters described herein may be particularly suitable for radio frequency (RF) filtering, such as for use in mobile cellular communications. For example, the resonators and filters described herein include microwave passive filters for use in mobile base station applications. Of course, the resonators and filters may also be used for other purposes and at other frequencies.

Air cavity filters and ceramic filters are known for use in mobile cellular communication base stations. Air-cavity filters may be more efficient in lower frequency bands (e.g. sub 6 GHz bands), whereas ceramic filters may be more efficient at higher frequencies.

Air cavity filters are often cheaper and may provide automated tuning capabilities. Ceramic filters may be more difficult to tune automatically but often offer better performance due to high Q values of modern ceramic materials. Providing metallic contacts to ceramic materials may cause difficulties. Furthermore, ceramic resonators and filters are typically relatively heavy.

FIG. 1 shows a resonator, indicated generally by the reference numeral 10, in accordance with an example embodiment. The resonator 10 comprises a metal wall 12 and a lid 14 that enclose a cavity 16. Multiple instances of the resonator 10 may be provided that collectively form a filter, as discussed further below.

Figure 2:
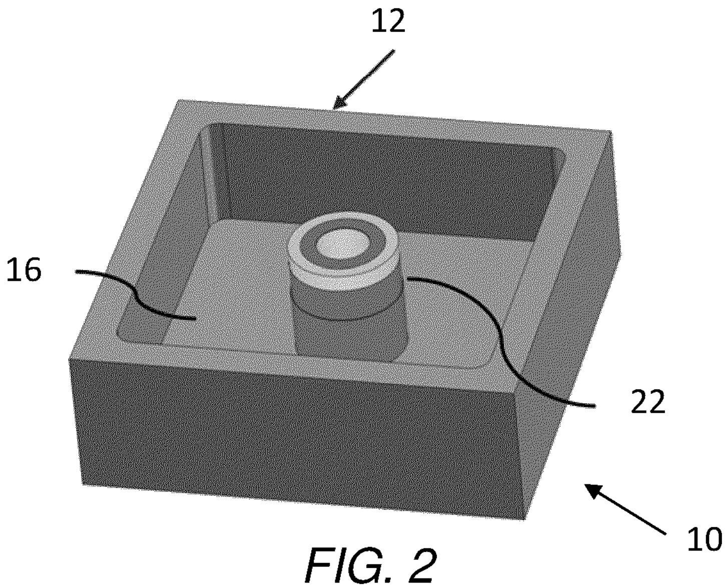
FIG. 2 shows the resonator of FIG. 1 without a lid.

FIG. 2 shows the resonator 10 without the lid 14. A resonator element 22 is provided within the cavity 16. The configuration of the cavity 16 and the resonator element 22 define the functionality of the resonator 10.

As shown in FIGS. 1 and 2, the metal wall 12 defines a square-shaped base of the resonator 10. This is not essential to all example embodiments; the base may have other shapes (such as a circle).

Figure 3:
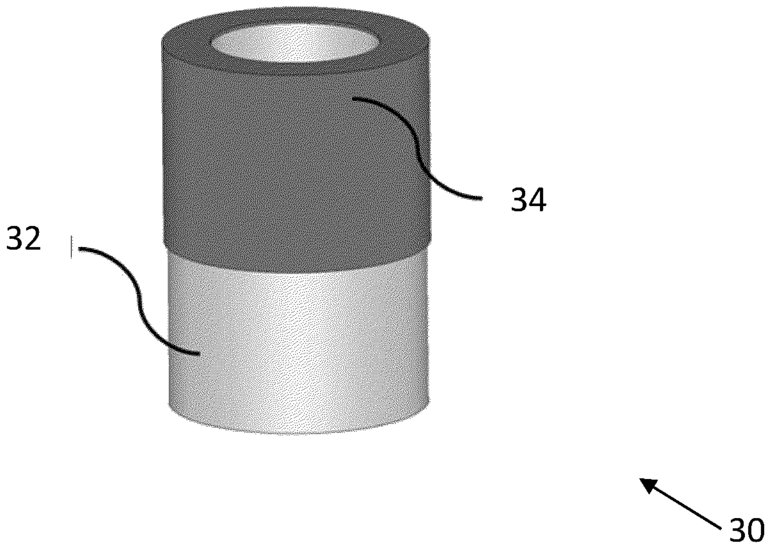
FIG. 3 shows internal elements of a resonator element in accordance with an example embodiment.

FIG. 3 shows internal elements, indicated generally by the reference numeral 30, of the resonator element 22 described above, in accordance with an example embodiment. The internal elements 30 comprise a first ring 32 and a first metal coating 34. The first ring 32 may be formed from a plastics material, such as Teflon®; alternative materials are also possible, such as alumina. The first metal coating 34 may be silver. The first ring 32 may be used to provide mechanical support and is sometimes referred to herein as a "first supporting ring".

Figure 4:
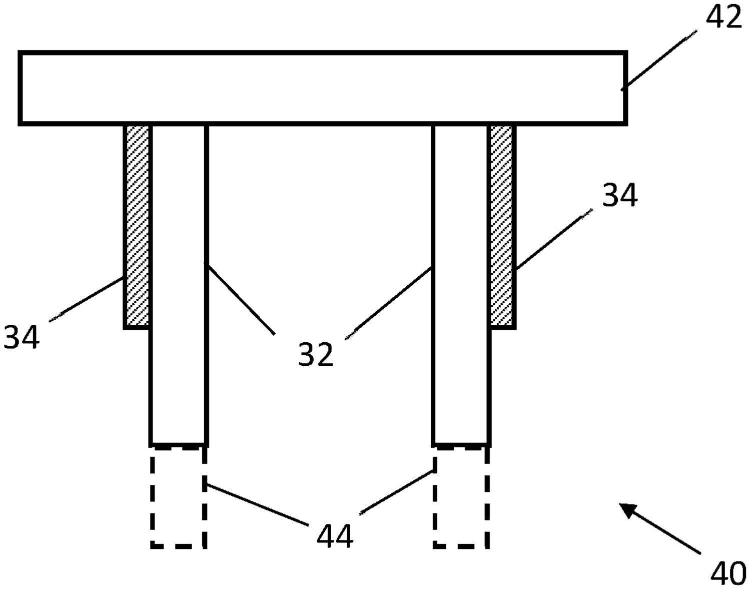
FIG. 4 is a cross-section of a first part of a resonator in accordance with an example embodiment.

FIG. 4 is a cross-section of a first part of a resonator, indicated generally by the reference numeral 40, in accordance with an example embodiment. The first part 40 comprises a lid 42 that forms a first part of a metal cavity.

As shown in FIG. 4, the first ring 32 extends into the cavity in a direction substantially perpendicular to the lid 42. The first ring 32 may be hollow (e.g. partially or substantially hollod), such as a hollow cylinder (e.g. a cylindrical hollow supporting ring). At least part of an external surface of the first ring 32 (e.g. a surface on the exterior of the hollow ring) is coated with the first metal coating 34 (e.g. a silver 35 coating) that provides an electrical connection to the metal cavity (i.e. to the lid 42).

As indicated by a dotted section 44, the first ring may be extended; as discussed below, the first extension 44 (e.g. a first supporting ring extension) may make contact with a base of the metal cavity, thereby providing mechanical support.

Figure 5:
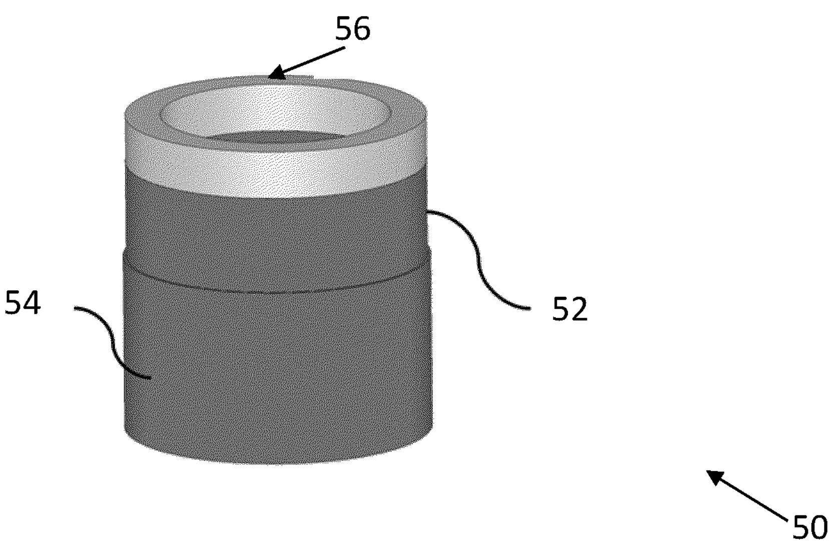
FIG. 5 shows external elements of a resonator element in accordance with an example embodiment.

FIG. 5 shows external elements, indicated generally by the reference numeral 50, of the resonator element 22 described above, in accordance with an example embodiment. The external elements 50 comprise a ceramic ring 52, a second metal coating 54 and a second ring 56. The second ring 56 (which may be omitted in some example embodiments) may be formed from a plastics material, such as Teflon®; alternative materials are also possible, such as alumina. The second metal coating 54 may be silver.

The second ring 56 may be used to provide mechanical support and is sometimes referred to herein as a "second supporting ring".

Figure 6:
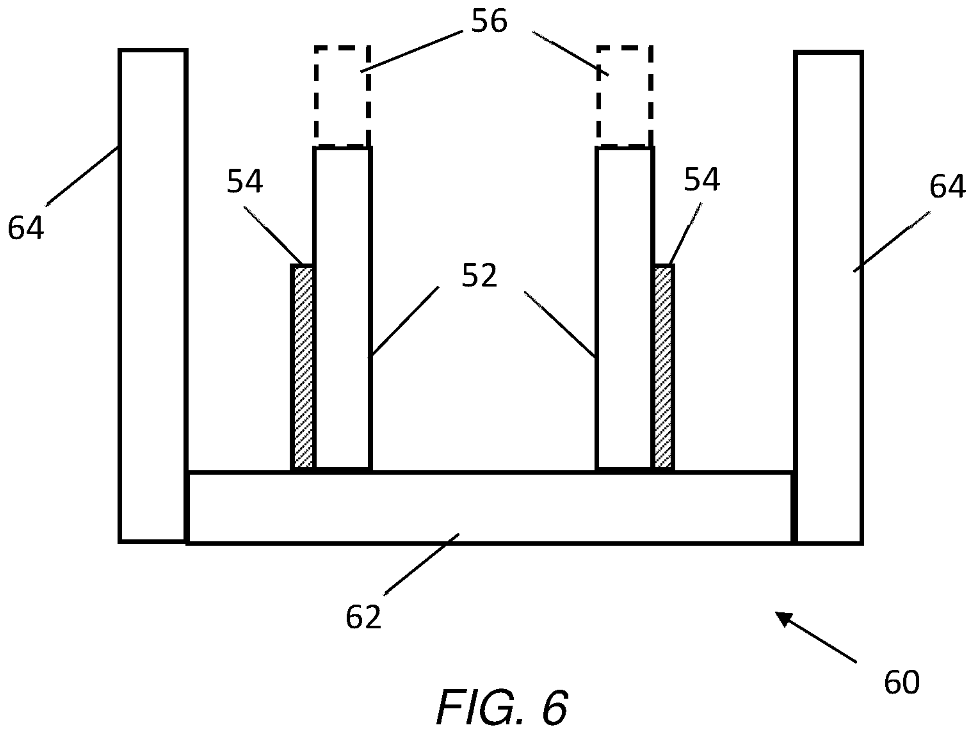
FIG. 6 is a cross-section of a second part of a resonator in accordance with an example embodiment.

FIG. 6 is a cross-section of a second part of a resonator, indicated generally by the reference numeral 60, in accordance with an example embodiment. The second part 60 comprises a resonator base 62 and sides 64 of the metal cavity. The first and second parts 40 and 60 may be joined to form a cavity resonator as discussed further below.

As shown in FIG. 6, the ceramic ring 52 extends into the cavity in a direction substantially perpendicular to the base 62. The ceramic ring 52 may be hollow, such as a hollow cylinder, and may, for example, be threaded for connection to the base 62. At least part of an external surface of the ceramic ring 52 (e.g. a surface on the exterior of the hollow ring) is coated with the second metal coating 54 (e.g. a silver coating) that provides an electrical connection to the metal cavity (i.e. to the base 62).

The second ring 56 extends from a distal end of the ceramic ring and may make contact with the lid of the metal cavity, as discussed further below. This may provide mechanical support. The second ring 56 may be omitted (and hence is shown in dotted form in FIG. 6).

Figure 7:
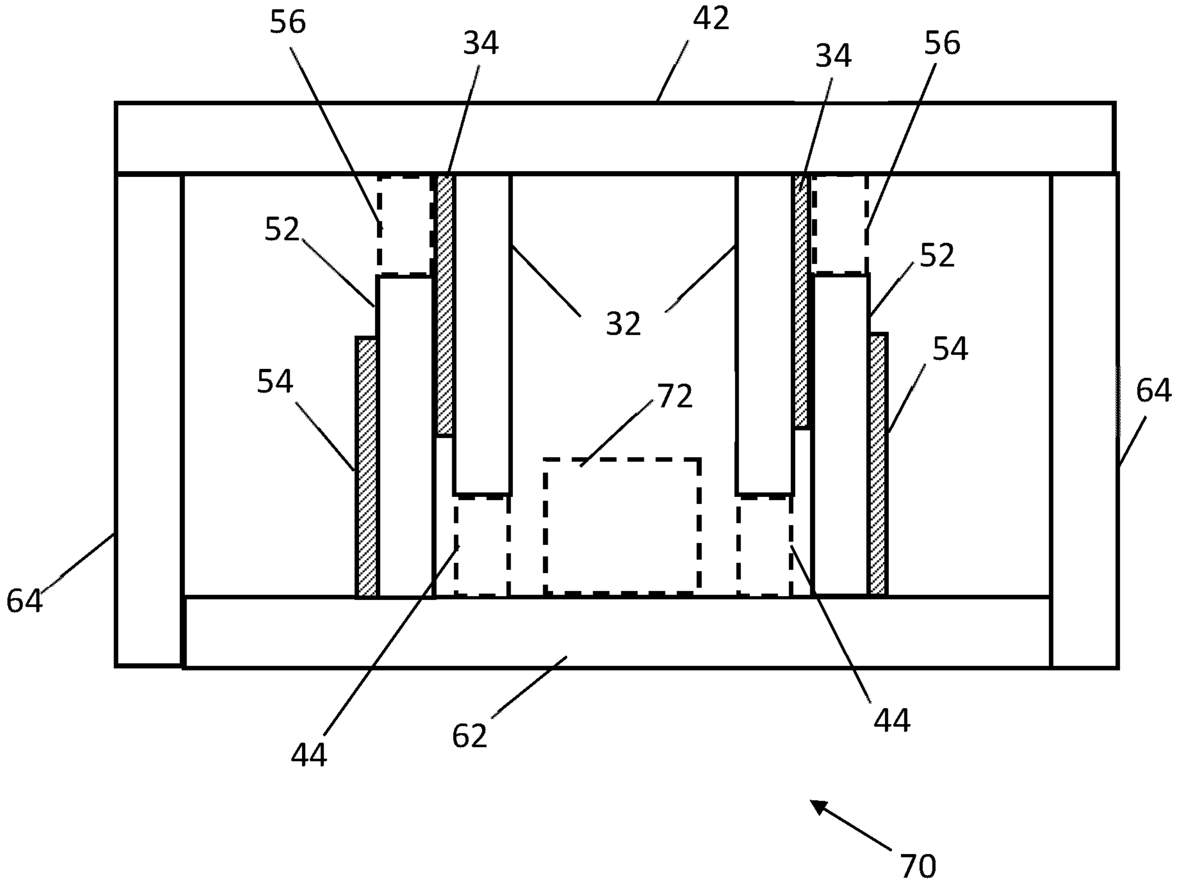
FIG. 7 is a cross-section of a resonator in accordance with an example embodiment.

FIG. 7 is a cross-section of a resonator, indicated generally by the reference numeral 70, in accordance with an example embodiment. The resonator 70 comprises the first part 40 and the second part 60 described above. The resonator 70 also comprises a metallic tuner 72, as discussed further below.

Thus, the resonator 70 comprises the first part 40 comprising the lid 42, the first ring 32 extending from the lid into the metal cavity, and the first metal coating 34. The resonator 70 further comprises the second part 60 comprising the resonator base 62, sides 64, the ceramic ring 52 extending from the base into the metal cavity, and the second metal coating 54.

In the resonator 70, the first and second parts 40 and 60 are mounted to form the metal cavity such that the first ring 32 and the ceramic ring 52 partially overlap such that at least part of the ceramic ring is between at least parts of the first and second metal coatings 34 and 54. As shown in FIG. 7, the metal coatings 34 and 54 overlap, with part of the ceramic ring being between the overlapping metal coatings.

In the resonator 70, the first extension 44 makes contact with the second part of the metal cavity (i.e. the resonator base 62). Similarly, the second ring 56 extends to make contact with the first part of the metal cavity (i.e. the lid). Contacts between supporting rings and the metal cavity structure can be used to provide mechanical support.

In the configuration shown in FIG. 7, the metallic tuner 72 forms part of the second part of the metal cavity (i.e. is provided at the resonator base 62). This is not essential, for example the metallic tuner could form part of the first part of the metal cavity.

The position of the metallic tuner may be adjustable, for example using a threaded screw or some similar arrangement.

The resonator 70 therefore comprises a ceramic module that can be used to decrease the resonant frequency (and hence reduce the size of the resonator). The ceramic ring 52 is provided between two thin metal coatings 34 and 54, thereby providing thin gaps that result in high capacitance, further improving the performance of the resonator.

The resonator is provided with air gaps that allow for components having different rates of thermal expansion to be accommodated. For example, the ceramic ring 52 is not required to be fixed between two metal plates and so movement, for example, of the metal cavity, can be accommodated. Moreover, the use of thin metal coatings results in limited differences in thermal expansion between metal and ceramic materials.

Figure 8:
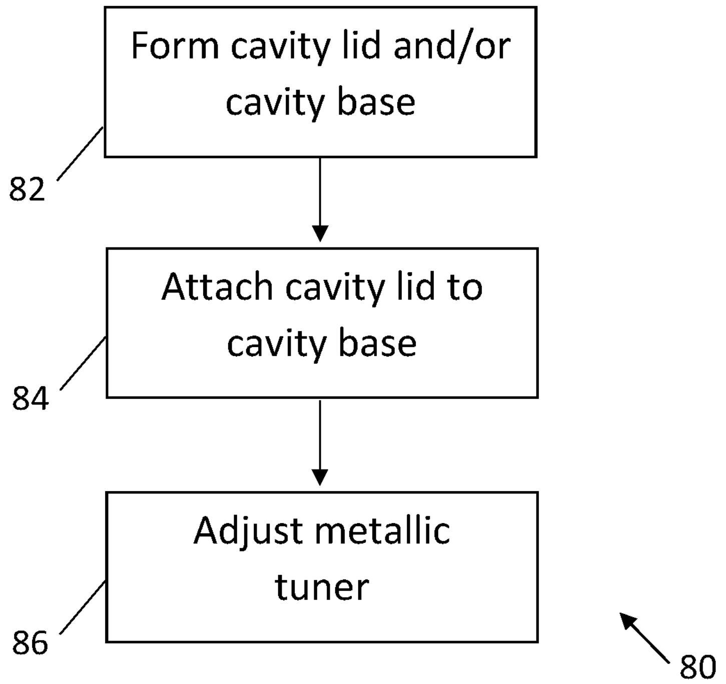
FIG. 8 is a flow chart showing an algorithm in accordance with an example embodiment.

FIG. 8 is a flow chart showing an algorithm, indicated generally by the reference numeral 80, in accordance with an example embodiment. The algorithm 80 may provide a method of manufacturing a resonator.

The algorithm 80 starts at operation 82, where a cavity lid and/or a cavity base (such as the first and second parts 40 and 60 described above) are formed.

At operation 84, the cavity lid is attached to the cavity base to form a metal cavity such that a first supporting ring and a ceramic ring of the metal cavity partially overlap, such that at least part of the ceramic ring is between at least parts of a first and a second metal coating (as described above). For example, the operation 84 may be implemented by sliding the first ring (e.g. first supporting ring) within the ceramic ring.

Note that the configuration of the first and second parts of the resonator can be reversed. Thus, with the operation 84 complete, the first ring extends from one of the lid and the base and the ceramic ring extends from the other of the lid and the base. The first ring comprises an external surface that is at least partially coated with the first metal coating, wherein, in use, the first metal coating provides an electrical connection to the metal cavity. Further, the ceramic ring comprises an external surface that is at least partially coated with the second metal coating, wherein, in use, the second metal coating provides an electrical connection to the metal cavity.

At operation 86, a position of a metallic tuner within the cavity may be adjusted.

It should be noted that one or both of the operations 82 and 86 are optional in some example embodiments.

Figure 9:
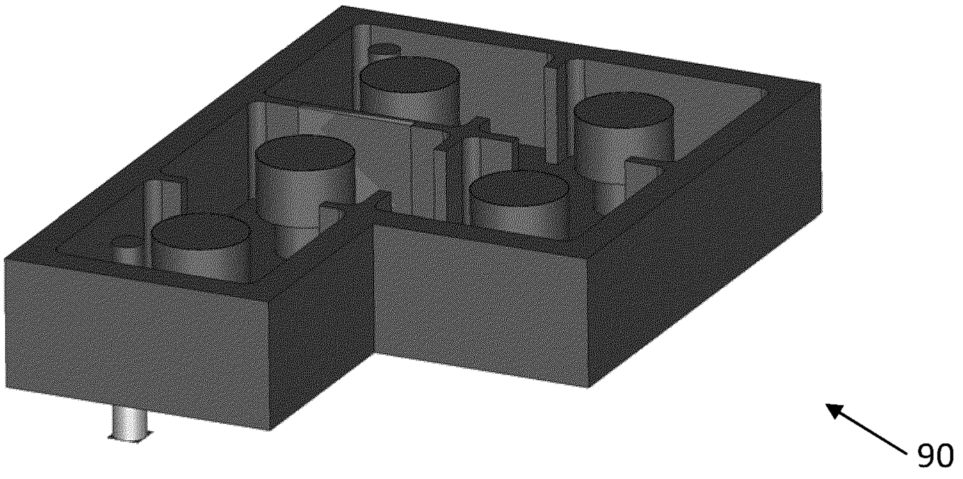
FIG. 9 is a filter in accordance with an example embodiment.

FIG. 9 is a filter, indicated generally by the reference numeral 90, in accordance with an example embodiment. The filter is a 5-pole filter, using five instances of a resonator as described herein.

Figure 10:
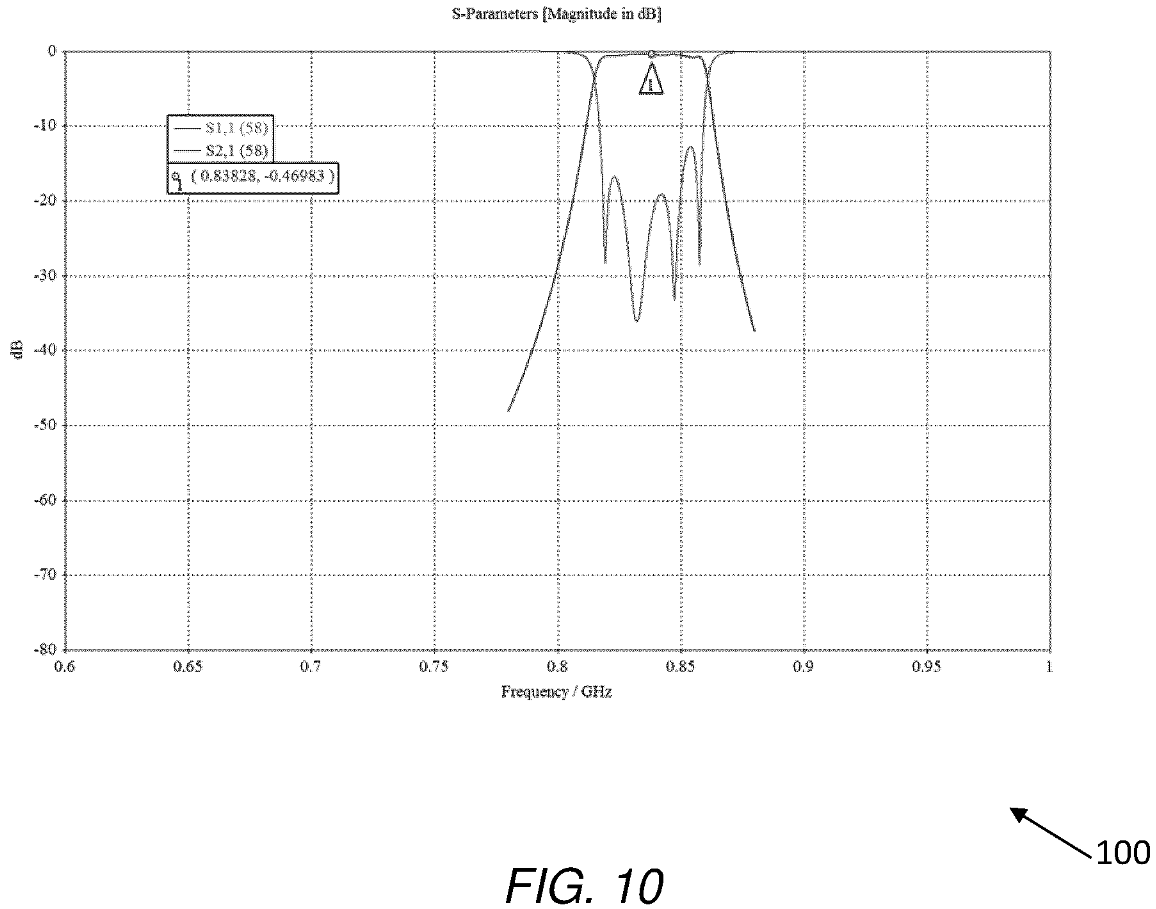
FIG. 10 is a plot showing a performance of the filter of FIG. 9.

FIG. 10 is a plot 100 showing a performance of the filter of FIG. 9. The centre frequency is 840 MHz. It has been found that the filter 90 provides good performance using resonators that are smaller than many prior art configurations.

At least some of the example embodiments described herein benefit from increased tolerances, easier fabrication, smaller dimensions and lower weight when compared with at least some prior art resonators. Moreover, mechanical stresses due to temperature fluctuations are low. Reliability in extreme and/or varying temperature conditions may be improved.

If desired, the different functions discussed herein may be performed in a different order and/or concurrently with each other. Furthermore, if desired, one or more of the above-described functions may be optional or may be combined. Similarly, it will also be appreciated that the flow diagram of FIG. 8 is an example only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A resonator, comprising:
a first part of a metal cavity;
a first ring extending from the first part of the metal cavity, wherein at least part of an external surface of the first ring is coated with a first metal coating that provides an electrical connection to the metal cavity;
a second part of the metal cavity; and
a ceramic ring extending from the second part of the metal cavity, wherein at least part of an external surface of the ceramic ring is coated with a second metal coating that provides an electrical connection to the metal cavity;
wherein the first part of the metal cavity and the second part of the metal cavity are mounted to form the metal cavity such that the first ring and the ceramic ring partially overlap such that at least part of the ceramic ring is between at least part of the first metal coating and at least part of the second metal coating; and
wherein the first ring extends to make contact with the second part of the metal cavity.

2. A resonator as claimed in claim 1, wherein the second part further comprises a second ring extending from a distal end of the ceramic ring.

3. A resonator as claimed in claim 2, wherein the second ring extends to make contact with the first part of the metal cavity.

4. A resonator as claimed in claim 1, wherein the ceramic ring is hollow.

5. A resonator as claimed in claim 1, wherein the first ring is hollow.

6. A resonator as claimed in claim 1, wherein the first ring is plastic or alumina.

7. A resonator as claimed in claim 1, wherein the second ring is plastic or alumina.

8. A resonator as claimed in claim 1, wherein the first part is a lid of the metal cavity.

9. A resonator as claimed in claim 1, wherein at least one of the first or the second metal coatings comprise silver.

10. A resonator as claimed in claim 1, further comprising a metallic tuner.

11. A resonator as claimed in claim 10, wherein the metallic tuner forms part of the first part of the metal cavity.

12. A resonator as claimed in claim 10, wherein the metallic tuner forms part of the second part of the metal cavity.

13. A resonator as claimed in claim 10, wherein a position of the metallic tuner within the cavity is adjustable.

14. A filter comprising a plurality of the resonators of claim 1.

15. A filter as claimed in claim 14, wherein the filter is comprised in a mobile base station.

16. A filter as claimed in claim 14, wherein the filter is a microwave passive filter.

17. A method, comprising:

forming a metal cavity with attaching a first part of the metal cavity to a second part of the metal cavity such that a first ring and a ceramic ring of the metal cavity partially overlap such that at least part of the ceramic ring is between at least part of a first metal coating and at least part of a second metal coating, wherein:

the first ring extends from one of the first part of the metal cavity and the ceramic ring extends from the second part of the metal cavity, wherein the first ring extends to make contact with the second part of the metal cavity;

the first ring comprises an external surface that is at least partially coated with the first metal coating, wherein, in use, the first metal coating provides an electrical connection to the metal cavity; and the ceramic ring comprises an external surface that is at least partially coated with the second metal coating, wherein, in use, the second metal coating provides an electrical connection to the metal cavity.

18. A method as claimed in claim 17, wherein attaching the first part of the metal cavity to the second part of the metal cavity comprises sliding the first ring within the ceramic ring.

19. A method as claimed in claim 17, further comprising forming at least one of the first part of the metal cavity or the second part of the metal cavity.

20. A method as claimed in claim 17, wherein the first part of the metal cavity is a lid and the second part of the metal cavity is a base.

* * * * *